(12) United States Patent
Rendina

(10) Patent No.: US 7,008,895 B2
(45) Date of Patent: Mar. 7, 2006

(54) METHOD FOR PRODUCING AN IMPROVED SUPPORTED CATALYST

(76) Inventor: David Deck Rendina, 967 Heritage Blvd., North Vancouver, B.C. (CA) V7J 3G6

( * ) Notice: Subject to any disclaimer, the term of this patent is extended or adjusted under 35 U.S.C. 154(b) by 190 days.

(21) Appl. No.: 10/336,394

(22) Filed: Jan. 4, 2003

(65) Prior Publication Data

US 2003/0130115 A1    Jul. 10, 2003

Related U.S. Application Data

(60) Provisional application No. 60/345,055, filed on Jan. 4, 2002.

(51) Int. Cl.
*B01J 29/06*    (2006.01)

(52) U.S. Cl. .............................. 502/64; 502/66; 502/80; 502/84; 502/182; 502/185; 502/216; 502/219; 502/220; 502/221; 502/222

(58) Field of Classification Search ................. 502/64, 502/66, 80, 84, 182, 185, 216, 219, 220, 502/221, 222
See application file for complete search history.

(56) References Cited

U.S. PATENT DOCUMENTS

| 2,486,361 | A | 10/1949 | Nahin |
|---|---|---|---|
| 4,111,795 | A | 9/1978 | Simpson |
| 4,822,590 | A | 4/1989 | Morrison |
| 4,853,359 | A | 8/1989 | Morrison |
| 4,996,108 | A | 2/1991 | Divigalpitiya |
| 5,279,720 | A | 1/1994 | Divigalpitiya |
| 5,279,805 | A | 1/1994 | Miremadi |
| 5,932,372 | A | 8/1999 | Rendina |
| 6,071,402 | A | 6/2000 | Danot |
| 6,143,359 | A | 11/2000 | Rendina |
| 2003/0149317 | A1 * | 8/2003 | Rendina ..................... 585/250 |

OTHER PUBLICATIONS

U.S. Appl. No. 10/223,096, date pending, Rendina.

* cited by examiner

*Primary Examiner*—Christina Johnson
(74) *Attorney, Agent, or Firm*—Anthony C. Edwards

(57) ABSTRACT

Highly active supported catalyst compositions and methods for producing more active supported catalyst compositions are disclosed. Said methods comprise steps for applying an adhesive coating of a catalytically active exfoliated transition metal dichalcogenide and promoters to the surface of a support medium prior to filling the pores of the support medium with catalytically active metals and/or promoters. A new method for applying a surface coating to a support is also disclosed.

17 Claims, No Drawings

METHOD FOR PRODUCING AN IMPROVED SUPPORTED CATALYST

RELATED REFERENCES

Reference is hereby made to commonly assigned provisional U.S. Patent application METHODS FOR PRODUCING AN IMPROVED SUPPORTED CATALYST, Ser. No. 60/345055, filed Jan. 4, 2002, the benefit of which is hereby claimed and the disclosure of which is incorporated herein by reference.

FIELD OF THE INVENTION

The present invention relates to new composite materials useful as catalysts and methods for producing new catalytically active composites. These catalyst composites may find use in a wide variety of chemical reactions. It is believed that they will be particularly useful in hydrogenation, hydrotreating, hydrocracking, oxidation, and water/gas shift reactions.

BACKGROUND

Supported catalysts are often formed by combining materials with different functional characteristics into one composite material. Some of the most thoroughly explored and widely used catalysts are comprised of materials that serve three basic functions. Typical illustrative examples of these compositions are the familiar cobalt-molybdenum-alumina, and nickel-molybdenum-alumina catalysts. In these composites the component comprised of alumina typically ranges between 80–85% percent by weight, the molybdenum component ranges between 10–20% percent by weight, and the cobalt/nickel component typically ranges from 0–5% percent by weight of the final catalyst. Although many variations on materials and methods of production have been discovered, the descriptions of the roles of the materials that comprise these composites are generally the same.

The chemical and structural interactions of all these components and the feedstock are directly related to the activity and/or selectivity of the catalyst and therefore the description of their functions should be considered as conventionally accepted descriptions rather than conclusively definitive descriptions. In these composites, the small quantities of metals like cobalt, nickel and others may be referred to as promoters (P) the molybdenum component comprises the main catalytically active material (M) and the alumina component acts as the support structure (S). For the purposes of this application, these catalyst types will be categorized on the basis of the three generally accepted functions of their materials, and will be hereinafter referred to collectively as promoter-main-support "PMS" catalysts.

It should be understood that the selection of promoter materials and combinations of promoter materials (P) can vary widely, and numerous support materials other than, or in combination with, alumina have been identified as the preferred support materials (S) for specific applications. However, for the purposes of the current invention only group IVB, VB, and VIB elements of the periodic table of elements would be included in the (M) component of the catalyst. Typically (M) materials would be selected from sources of molybdenum and/or tungsten.

U.S. Pat. No. 2,486,361 to Nahin et al, is representative of many patents that teach the basic methods employed to produce PMS catalysts. Generally, processes for preparing catalysts of the PMS type employ methods for impregnation and/or co-precipitation of a support material. A significant number of modifications in impregnation techniques have been identified in literature. Typically, when preparing such a catalyst by impregnation, the support, in the form of powders, granules, or pellets of, for example, preformed gamma alumina, is either simultaneously, or sequentially impregnated with a solution of a suitable soluble salt, typically an aqueous solution of ammonium molybdate, and a soluble promoter salt, such as cobalt nitrate, or the like. Whereupon the carrier, having absorbed a portion of the solution, is dried and calcined at a temperature in the range of about 400 C. to about 700 C. to convert the adsorbed salt to the oxide of the metal or metals employed. The catalysts are then sulfided immediately prior to use.

In preparing a catalyst by co-precipitation the process usually embodies a simultaneous precipitation of the hydrated oxide of the support and typically the hydrated oxide or oxides of the desired catalytic agents from a solution containing appropriate amounts of the suitable soluble salt of the carrier type material and the metal or metals employed as catalytic agents. A common modification of this procedure consists of precipitating the hydrous oxides of the catalytic agent in the presence of a wet carrier gel.

Many other variations in co-precipitation have been described including those recorded in U.S. Pat. No 4,853,359 to Morrison et al., where we are taught methods for instigating a co-precipitation of support material and promoters with the simultaneous flocculation of dispersed sheets of exfoliated $MoS_2$, $WS_2$, and $TaS_2$ to form a coating on the support. In addition to methods described in the 359 patent, some examples of variations in support materials that may be coated with exfoliated layered transition metal dichalcogenides, as well as methods for including various species between sheets that may be useful as promoters, are described in U.S. Pat. Nos. 6,143,359, 6,071,402, 5,932,372, 5,279,720, 4,996,108, and 4,822,590.

Many of the most dramatic increases in catalyst activity seen in recent years have been achieved, at least in part, by an increased ability to form porous support materials with high surface areas with defined pore sizes and pore volumes. It is believed that some of the benefit derived from these new supports is their ability to expose more of the active sites on the molybdenum or tungsten portion of the catalyst. Methods for converting exfoliated sheets of transition metal dichalcogenides into solid porous structures are described in U.S. Pat. No. 5,279,805 as well as the current inventors pending U.S. patent application Ser. No. 10/223,096.

It would be beneficial if effective means could be found for making improved PMS catalysts with a large selection of support materials and a large variety of promoters employed individually or in combination.

It would be difficult to conceive of a more obvious avenue to explore to improve activity in PMS catalysts, than that of increasing the content of active metals within a given volume of the catalyst. Methods for increasing active metal loadings in PMS catalysts have been reported. For example Simpson, in U.S. Pat. No. 4,111,795, describes a method for mulling catalyst materials and careful calcinations that apparently allows for up to 30% $MoO_3$ by weight content. However, due to various limitations such as pore volume, pore size and surface area of the support, as well as other more imponderable factors, it has rarely been found possible to derive worthwhile benefit from increasing the metal loading of PMS catalysts beyond certain rather definite levels, usually between 18–20 weight percent $MoO_3$ and 4–5 weight of promoter. As a consequence most commercial PMS type catalysts contain between about 12 and 16 weight percent $MoO_3$ and about 2–5 weight percent of promoter. In commercially prepared PMS catalysts, activity reportedly begins to level off at about 16 weight percent $MoO_3$, and at higher $MoO_3$ levels, above about 22 weight percent, a very definite loss in activity is usually observed.

It would be beneficial if methods could be found to effectively load higher quantities of active metals per unit volume of catalyst.

The inventor has discovered that these and other benefits may be achieved when those skilled in the art combine known techniques for coating support materials with exfoliated sheets of layered transition metal dichalcogenides such as exfoliated $MoS_2$, $WS_2$ and the like, with the skilled application of known techniques for the filling the pores of the said coated supports as described by way of example in the methods below.

SUMMARY OF THE INVENTION

The activities of PMS catalysts are limited by the quantities of active catalytic sites that can be exposed in the metals that make up the catalyst. Typically these metals are supported on porous inert substrates. Catalyst manufacturers make a concerted effort to manufacture catalyst supports, usually in the form of extrudates, which expose the maximum number of active sites in the metals employed. Techniques used to incorporate the active metals into the catalyst support, such as incipient wetness, dry impregnation, or gel processes, etc., typically involve means to insert the active metals into the pores of the pre-formed support. Thus it is believed that the quantity of active sites is limited by amount of active metals that can be converted and retained in the pores of the support.

Methods previously described in literature for coating support materials with exfoliated transition metal dichalcogenides can produce catalysts with similar or higher metal loadings that provide activities—with most of the feedstocks tested—under the most common temperature, pressure, and flow rate conditions—similar to commercial catalysts.

The inventor has surprisingly discovered that catalytically active composites produced by sequentially combining techniques for coating supports with techniques for impregnating supports, have a higher quantity of active metals effectively loaded within a given volume of catalyst than is possible by coating or pore impregnation techniques alone. It is believed that this higher active metal loading is responsible for the higher activity and/or higher selectivity that catalysts made with these new methods exhibit. In addition, as a consequence of the inventor's thorough investigation of the properties and methods for producing these enhanced catalyst composites, a new method for producing a coated support material has also been uncovered.

DETAILED DESCRIPTION OF THE INVENTION

Catalytically active compositions of matter produced by these new methods may be described as having the form;

P1:M1-S-M2:P2

Where:

(P1) materials, or combinations of P1 materials, are selected from the group of materials that promote catalytic activity, and that form inclusions within sheets of an exfoliated transition metal dichalcogenide, comprising 0–15 percent by weight of the final composition, (M1) materials, or combinations of M1 materials, are selected from the group of catalytically active exfoliated transition metal dichalcogenides comprised of group IVB, VB, VIB elements that can be deposited as sheets on the surface of a support material, comprising 1–90 percent by weight of the final composition, (S) materials are selected from the group of porous, largely inert support materials to which exfoliated transition metal dichalcogenides will adhere, comprising 10–90 percent by weight of the final catalyst composition, (M2) materials, or combinations of M2 materials, are selected from the group of catalytically active materials that can be formed from precursors within the pores of said support material, comprising 1–30 percent by weight of the final catalyst composition, (P2) materials, or combinations of P2 materials, are selected from the group of materials that promote catalytic activity that can be formed from precursors within the pores of said support material comprising 0–15 percent by weight of the final catalyst composition.

The methods disclosed in the present invention are comprised of a minimum of three steps, preferably performed in the following sequence; (1) coating the selected catalyst support material with active catalytic materials in the form of exfoliated sheets of transition metal dichalcogenides, preferably exfoliated sheets of molybdenum and/or tungsten metal sulfides, with or without inclusions of promoter materials, and (2) drying the coating to form an adhesive bond between the coating and the surface of the support before (3) filling the pores of the, now coated, support with additional metals.

The selection of promoter materials (P1) is preferably determined by the ability of the promoter material to improve the activity and/or selectivity of the catalyst and on the basis of its ability to be included within layers of the deposited exfoliated material (M1). Inclusions of various promoter materials (P1) such as metals, metal salts, metal oxides, metal hydrides, metal organic compounds, etc., may be incorporated within the layers of the exfoliated materials, by known methods, prior to coating the support materials. Alternatively, the exfoliated materials and the promoter materials may be added in sequence to the surface of the support. If they are added in sequence, than a drying step may be incorporated between sequential coatings to remove the dispersing solvent. The support coating process may be repeated. The process for making extrudates from support materials, comprised primarily of various combinations of alumina and silica, typically incorporates a step where acid is added to the support material to form a peptide. If acid addition steps are employed to shape the support it is preferred that (M1) and (P1) materials be added to the support either prior to, or simultaneously with, the addition of the acid.

The exfoliated sheets of layered material (M1), optionally with inclusions (P1), may be applied to coat the support material as a sub-monolayer, monolayer, or multiple layers. The sheets may be distributed randomly on the support surface or they may coat the surface relatively uniformly or they may be stacked in some areas and not in others. Although the sheets may coat the internal surfaces of the porous support it is preferred that they do not block the pores. Preferably, this provides a catalytically active porous support structure, rather than an inert support structure, with a surface area and pore volume similar to an uncoated support.

The promoter materials (P1) and the dispersed exfoliated transition metal dichalcogenide coating materials (M1) may be combined with the selected support by methods described in the current application or by any of the known methods, some examples of which are described in U.S. Pat. Nos. 5,932,372, 4,853,359, and 5,279,720. Said known methods being incorporated in the present invention by reference.

A new method for coating a support with an exfoliated transition metal dichalcogenide has been uncovered and forms a part of the present invention, said method being comprised of the following steps;

a) including a support precursor between sheets of the exfoliated material b) heating the combined materials in a manner, and in an atmosphere, that converts the precursor to the desired support material.

The quantity of (M 1) coating material may range from less than 1 percent to greater than 90 percent of the weight of the final catalyst composites. However, it is preferred that the final catalysts are comprised of less than 90 percent by weight of the exfoliated (M1) coating components. It is more preferred that the (M1) components comprise between 1 and 50 percent by weight of the final composition, and most preferred that the (M1) components comprise between 12 and 30 percent by weight of the final catalyst composite.

The active materials employed to coat the support materials (M1) are exfoliated transition metal dichalcogenides. It is preferred that the exfoliated materials are either exfoliated $MoS_2$ or $WS_2$. However, other catalytically active exfoliated materials from groups IVB, VB and VIB of the periodic table of elements may be used. Said active exfoliated materials should be applied as a coating to the selected support materials prior to any heat treatments designed to improve the pore structure of the support, such as converting one form of alumina to another form of alumina through calcination. Some or all of said exfoliated materials may be intentionally converted from sulfides to oxides, carbides, nitrides, etc., by known methods, or inadvertently converted as a result, for example, of the process used to improve the pore structure of the composite. If the conversion is inadvertent, for example through calcinations, it may be necessary to persulfide the entire composition or employ other selective conversion steps prior to use.

The catalyst supports (S) may be formed using any of the materials typically employed for this purpose, whether naturally occurring, like bohemite clays and carbon, or synthetic, like synthetic zeolites. The preferred support materials are comprised in part of alumina.

Many support materials, particularly those comprised in part of various forms of alumina and silica require careful and often repeated heating at high temperatures under various types of atmospheres, in order to form the optimum pore structure, or to convert the active material within the pores of the support to the desired material for their selected reaction or feedstock. Typical examples of such heat or conversion treatments include calcination and sulfiding.

The present inventor has found that those heating and conversion techniques typically carried out by those skilled in the art do not detrimentally effect the activity or adhesion of the exfoliated transition metal dichalcogenides to supports comprised of alumina to a significant degree, and that any of the standard sequences of heat and atmosphere treatments may be applied. For example, alumina/silica support particles may be coated with an exfoliated $MoS_2$ and inclusion of cobalt, then heated to dry and bond the coating to the support, then calcined to convert the support to the desired pore structure, then the coated porous material may be impregnated with a metal precursor such as ammonia-heptamolybdate, and/or a promoter such as nickel nitrate and heated to convert the impregnated material to an oxide, then finally heated in the presence of a sulfur containing gas to convert the oxides to catalytically active sulfides without significantly diminishing the effectiveness of the coating component of the composite.

Once the coated support materials have been formed into structurally stable, porous compositions, traditional methods for impregnating the pores with active metals may be followed. Various suitable materials, commonly used as precursors for catalytically active metals, (M2) such as those selected from group VIB of the periodic table of elements are well known to the skilled person. Examples of molybdenum sources for (M2) are molybdenum oxides and hydroxides, molybdic acid, molybdophosphoric acid, molybdosilicic acid, molybdenum acetylacctonate, molybdenum xanthate, ammonium molybdate, ammonium heptamolybdate, molybdenum salts such as molybdenum fluoride, molybdenum chloride, molybdenum bromide, molybdenum iodide, molybdenum oxyflouride, molybdenum oxychloride, molybdenum oxybromide, molybdenum oxyiodide, molybdenum hydride, molybdenum nitride, molybdenum oxynitride, molybdenum boride, molybdenum carbide, molybdenum oxycarbide, molybdenum phosphide, molybdenum sulfide, hexacarbonyl molybdenum, thiomolybdates, molybdenum thiophosphates, molybdenum xanthates and thioxanthates, molybdenum dithiophosphates, dithiocarbamates, and dithiophosphinates, and molybdenum carboxylates. Similar sources for other group IVB, VB, and VIB elements may be employed individually or in combinations.

Standard methods for converting these precursors may be utilized such as heating under various atmospheres and at various temperatures in order to create the desired final form of the active metals. These heat and/or atmospheric treatments may also alter the final form of the active metals used in the previously described coating process. Typically these additional active materials (M2) will comprise less than 30 percent by weight of the final catalyst. It is preferred that the (M2) materials comprise less than 20 percent by weight of the final composite. It is most preferred that said (M2) materials comprise between 10 and 16 percent by weight of the final composition.

Promoter component (P2) materials are preferably selected on the basis of the ability of the promoter material to improve the activity and/or selectivity of the catalyst and on the basis of its ability to be impregnated and/or converted within the pore structure of the support. Impregnations of various precursors of promoter materials (P2) such as metals, metal salts, metal oxides, metal hydrides, metal organic compounds, etc., are well known.

The catalysts described in current invention may be beneficially used for a wide variety of reactions with a number of different feedstocks. Although not wishing to be limited, examples of such reactions include hydrogenation, hydrocracking, hydrodesulfurization hydrodenitrogenation, water gas shift, oxidation, and others. The examples of experiments described below are meant to illustrate certain critical elements of the invention without limiting the scope of how the current invention may be applied.

Experiment 1 (prior art)

Particles of alumina/silica were added according to known methods to dispersions of exfoliated molybdenum disulfide with inclusions of nickel nitrate in a manner that caused the particles to become coated with the dispersed materials. The combined materials were dried to remove the dispersing solvent. The composite material was then mixed with a quantity of nitric acid to form a gel like substance and extruded through a die. The thus formed extrudates was calcined at 550 C to form a structurally stable, porous material. The surface area and composition of a sample of the extrudate was measured with the following results:
Surface area ~200 $m^2/g$
Composition ~18% $MoS_2$ and 3% Ni with the balance in alumina/silica After pre-sulfideing, the activity of the final catalyst for removal of sulfur was tested against a thiophene feedstock. A conversion rate of ~80% was achieved.

Experiment 2 (prior art)
A commercially available hydrodesulfurization catalyst, reportedly prepared by loading active metal precursors by incipient wetness techniques within the pores of a preformed extrudate comprised in part of gamma alumina and subsequently converting the precursors to sulfides, was tested under the same conditions as those described in experiment 1 above. Prior to testing, the surface area and composition of the catalyst were measured and found to be similar to those described in the catalyst of experiment 1. A conversion rate ~80% was achieved.

Experiment 3
Precipitated particles of alumina/silica were simultaneously flocculated with a dispersion of exfoliated molybdenum disulfide in a solution containing of nickel nitrate and a quantity of nitric acid to form a gel like substance and then extruded through a die. The thus formed extrudates were calcined at 550 C to form a structurally stable, porous material. The surface area and composition of a sample of the extrudate was measured with the following results:
Surface area ~180 $m^2/g$
Composition ~30% $MoS_2$ and ~4% Ni with the balance in alumina/silica Quantities of ammonia heptamolybdate and nickel nitrate were impregnated into the pores of the extrudate and converted by standard methods to catalytically active materials. The resulting P1:M1-S-M2:P2 final catalyst was tested for activity in sulfur removal in a manner identical to Experiment 1 and a conversion rate of greater than 90% was achieved.

Experiment 4
A sufficient quantity of a metal organic compound of platinum to provide greater than ~0.01 percent by weight of platinum in the final composition was dissolved in an organic solvent and mixed with a quantity of light oil. Exfoliated $MoS_2$ was dispersed in the oil by known methods and induced to include the oil and the platinum promoter material within layers. The combined materials were placed in a tubular reactor substantially free of oxygen and heated under flowing acetylene to produce a dry, fluffy, P1:M1-S material with a carbon support. The combined material was then mixed with a solution of ammonium heptamolybdate, additional platinum precursor, and water to form a damp slurry. Mixing continued for a sufficient time to form a substantially uniform mixture.

The mixture was extruded through a nozzle under pressure and was heated for ~24 hours at ~180 C in air to dry and de-ammoniate and to form the P1:M1-S-M2:P2 composite.

The following claims and their obvious equivalents are believed to define the true scope of the invention.

I claim:
1. A catalytically active composition of matter of the following approximate general formula:

P1:M1-S-M2:P2

Where:
P1 is selected from athe group of materials that promote catalytic activity and that form as an inclusion within sheets of an exfoliated transition metal dichalcogenide comprising 0–15 percent by weight of the final composition,
M1: is selected from athe group of catalytically active exfoliated transition metal dichalcogenides comprised of group IVB, VB, VIB elements that can be deposited as sheets on the surface of a support material, comprising 1–90 percent by weight of the final composition,
S: is selected from athe group of porous, largely inert support materials to which exfoliated transition metal dichalcogenides will adhere, comprising 10–90 percent by weight of the final catalyst composition,
M2: is selected from athe group of catalytically active materials that can be formed from precursors within the pores of said support material, comprising 1–30 percent by weight of the final catalyst composition,
P2: is selected from athe group of materials that promote catalytic activity and that can be formed from precursors within the pores of said support material comprising 0–15 percent by weight of the final catalyst composition, in which the support material is comprised of naturally occurring minerals.

2. A catalyst according to claim 1, in which the support material is comprised of naturally occurring clay.

3. A catalyst according to claim 2, in which the clay is a bohemite clay.

4. A catalytically active composition of matter of the following approximate general formula:

P1:M1-S-M2:P2

Where:
P1 is selected from athe group of materials that promote catalytic activity and that form as an inclusion within sheets of an exfoliated transition metal dichalcogenide, comprising 0–15 percent by weight of the final composition,
M1: is selected from athe group of catalytically active exfoliated transition metal dichalcogenides comprised of group IVB, VB, VIB elements that can be deposited as sheets on the surface of a support material, comprising 1–90 percent by weight of the final composition,
S: is selected from athe group of porous, largely inert support materials to which exfoliated transition metal dichalcogenides will adhere, comprising 10–90 percent by weight of the final catalyst composition.
M2: is selected from athe group of catalytically active materials that can be formed from precursors within the pores of said support material, comprising 1–30 percent by weight of the final catalyst composition,
P2: is selected from athe group of materials that promote catalytic activity and that can be formed from precursors within the pores of said support material comprising 0–15 percent by weight of the final catalyst composition, in which the support material is comprised of carbon.

5. A catalytically active composition of matter of the following approximate general formula:

P1:M1-S-M2:P2

Where:
P1 is selected from athe group of materials that promote catalytic activity and that form as an inclusion within sheets of an exfoliated transition metal dichalcogenide, comprising 0–15 percent by weight of the final composition,
M1: is selected from athe group of catalytically active exfoliated transition metal dichalcogenides comprised of group IVB, VB, VIB elements that can be deposited as sheets on the surface of a support material, comprising 1–90 percent by weight of the final composition,
S: is selected from athe group of porous, largely inert support materials to which exfoliated transition metal dichalcogenides will adhere, comprising 10–90 percent by weight of the final catalyst composition,
M2: is selected from athe group of catalytically active materials that can be formed from precursors within the pores of said support material, comprising 1–30 percent by weight of the final catalyst composition,
P2: is selected from athe group of materials that promote catalytic activity and that can be formed from precursors within the pores of said support material comprising 0–15 percent by weight of the final catalyst composition, in which the support material is synthesized, in which the support material is comprised of synthetic zeolite.

6. A process for the preparation of a catalytically active composition of matter of the following approximate general formula:

P1:M1-S-M2:P2

Where:
P1 is selected from athe group of materials that promote catalytic activity and that form as an inclusion within sheets of an exfoliated transition metal dichalcogenide, comprising 0–15 percent by weight of the final composition,
M1: is selected from athe group of catalytically active exfoliated transition metal dichalcogenides comprised of group IVB, VB, VIB elements that can be deposited as sheets on the surface of a support material, comprising 1–90 percent by weight of the final composition,
S: is selected from athe group of porous, largely inert support materials to which exfoliated transition metal dichalcogenides will adhere, comprising 10–90 percent by weight of the final catalyst composition,
M2: is selected from athe group of catalytically active materials that can be formed from precursors within the pores of said support material, comprising 1–30 percent by weight of the final catalyst composition,
P2: is selected from athe group of materials that promote catalytic activity and that can be formed from precursors within the pores of said support material comprising 0–15 percent by weight of the final catalyst composition, the process comprising the following steps:
a) coating a selected catalyst support material (S) wit active catalytic materials in the form of exfoliated sheets of transition metal dichalcogenides, preferably exfoliated sheets of molybdenum and/or tungsten metal sulfides (M1), with or without inclusions of promoter materials (P1),
b) drying the coating in a manner that forms an adhesive bond between the coating and the surface of the support,
c) filling the pores of the support with additional materials (M2) and optionally materials (P2).

7. A process according to claim 6 where the steps are conducted in the following sequence:
step a) followed by step b) followed by step c).

8. The process of claim 7 where the sequence of said steps a) and b) are repeated prior to said step c).

9. The process of claim 7 where said step c) is repeated.

10. A process according to claim 6, where said materials (M1) and (P1) of step a) are applied sequentially with said step b) being inserted between each application.

11. A process according to claim 6, where the materials (M2) and (P2) of step c) are applied sequentially and a heat treatment is inserted between each application.

12. A process according to claim 6, where the support material (S) of step a) is an uncoated powder.

13. A process according to claim 6, where the support material (S) of step a) is precipitated from a solution as part of step a).

14. A process according to claim 6, where the support material (S) of step a) is formed from a precursor included between sheets of material (M1) as part of step a).

15. A method for forming an exfoliated transition metal coated support material said method comprising the following steps:
a) including a support precursor between sheets of the exfoliated material
b) heating the combined materials in a manner, and in an atmosphere, that converts the precursor to the desired support material without chemically altering the exfoliated transition metal dichalcogenide.

16. A method according to claim 15, where the said precursor is comprised of carbon.

17. A method according to claim 15, where oxygen is substantially eliminated from the atmosphere.

* * * * *